Patented Oct. 2, 1928.

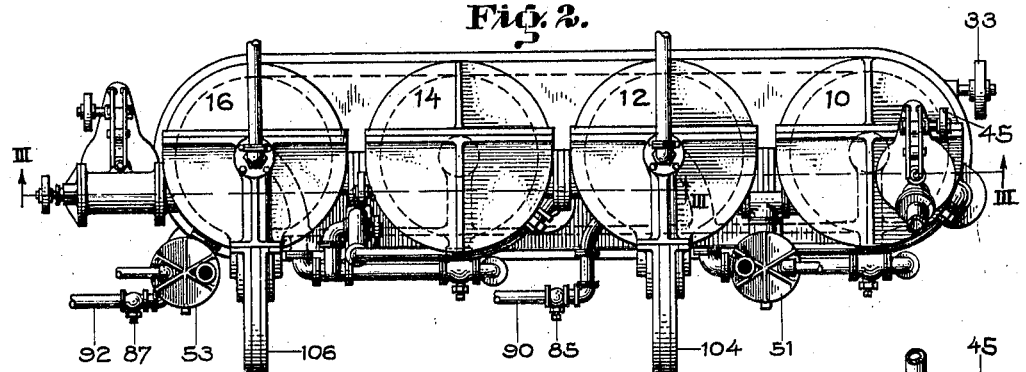
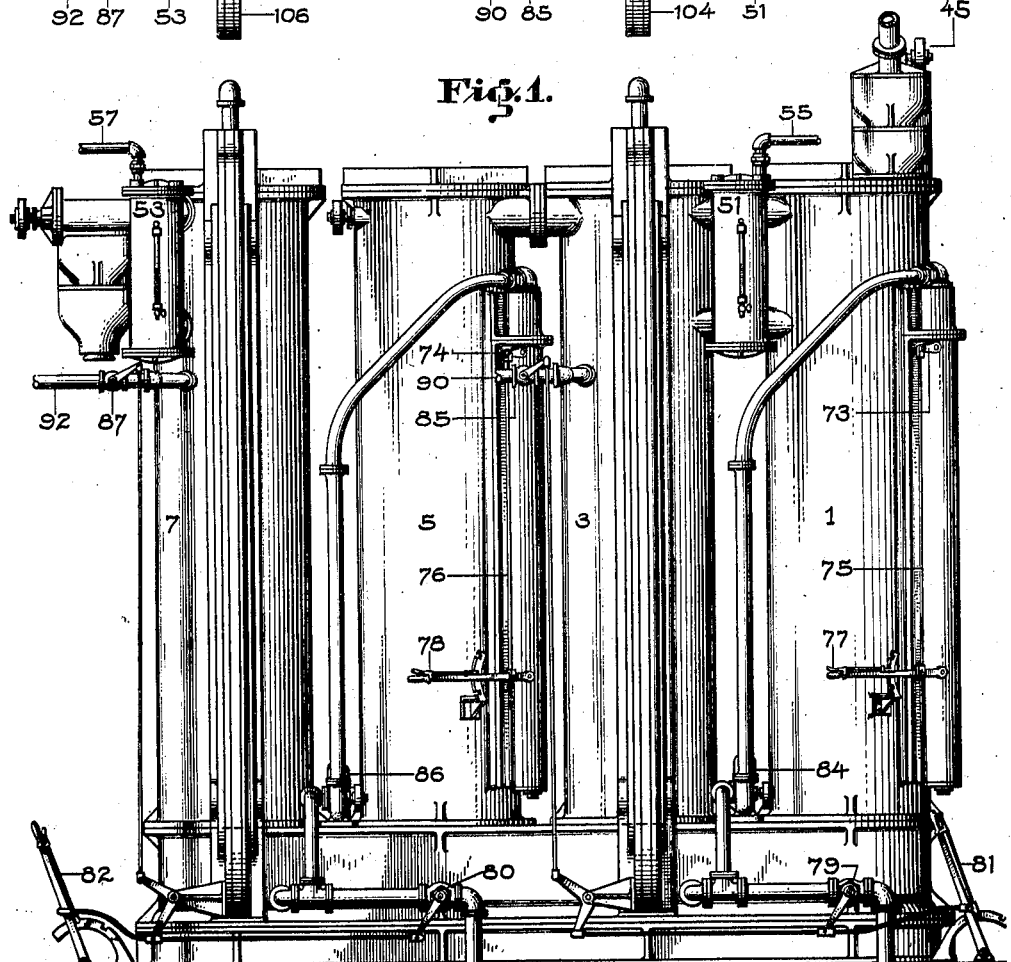

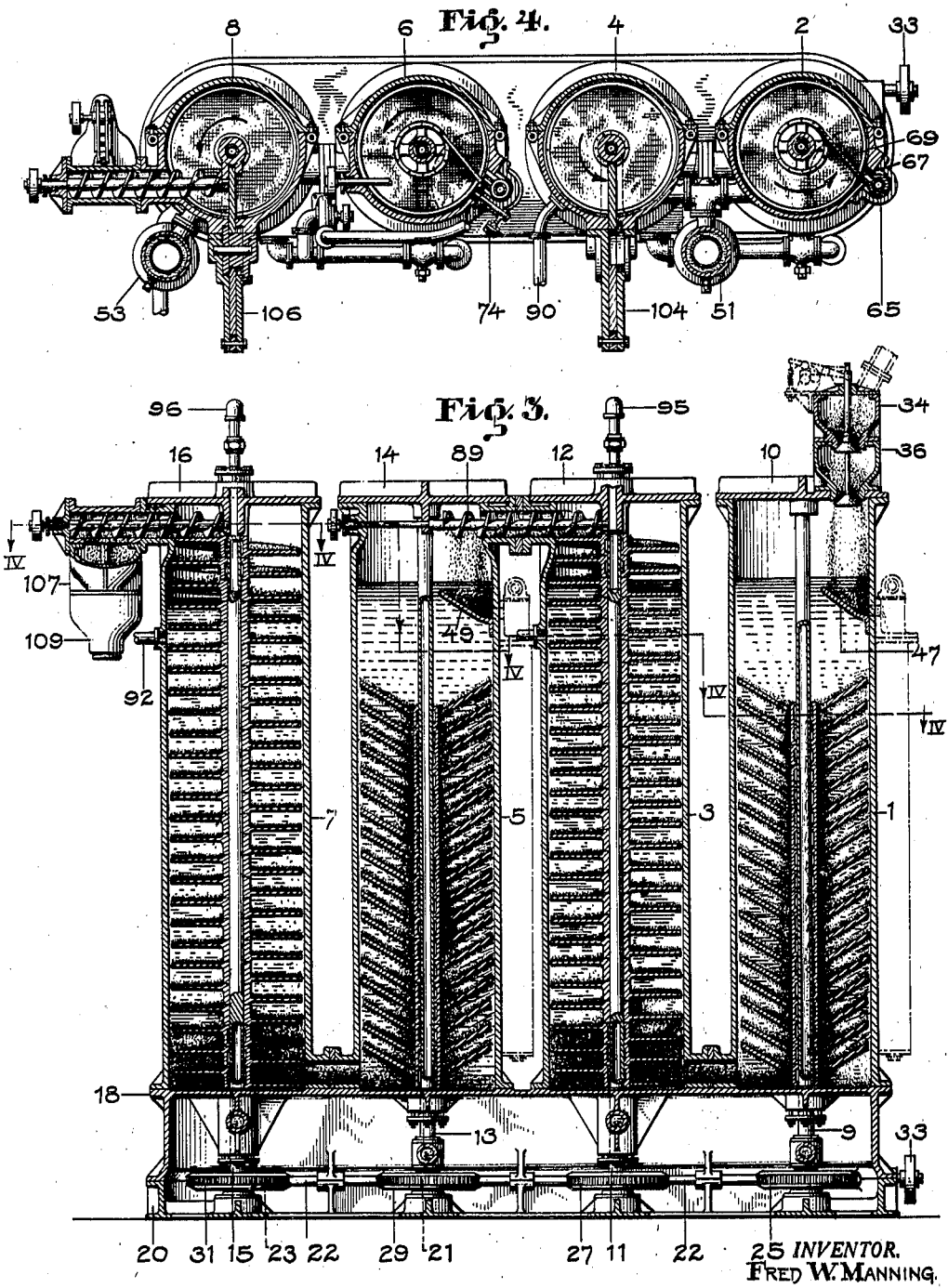

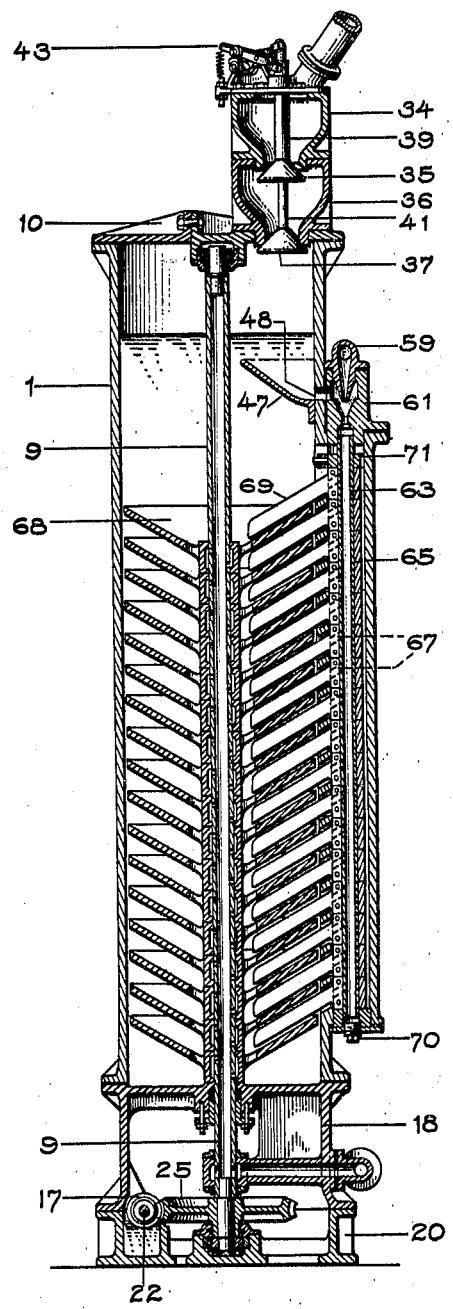

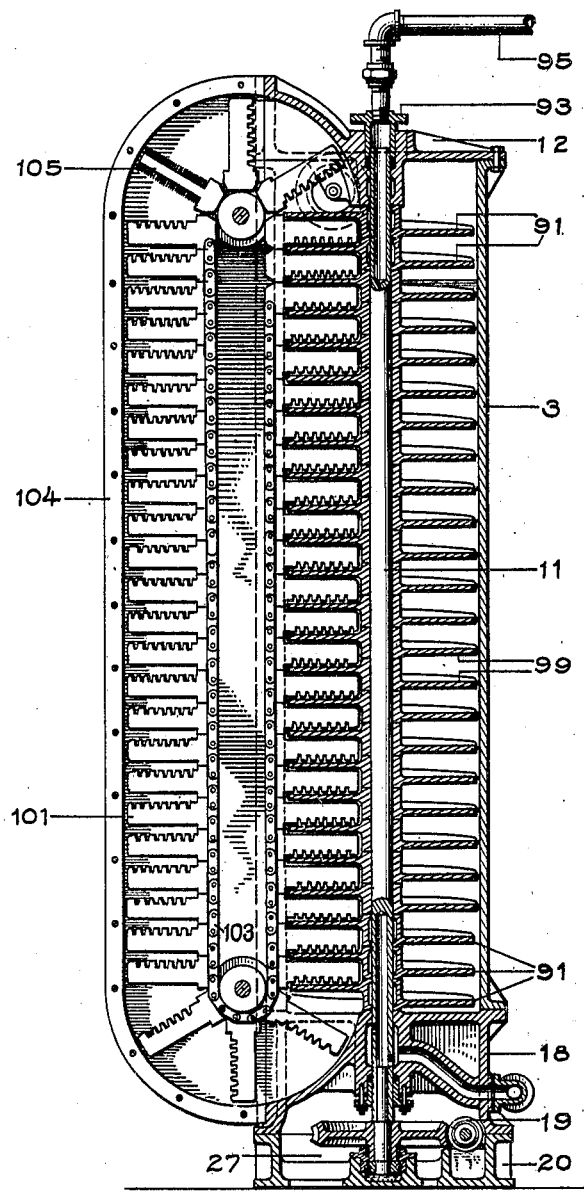

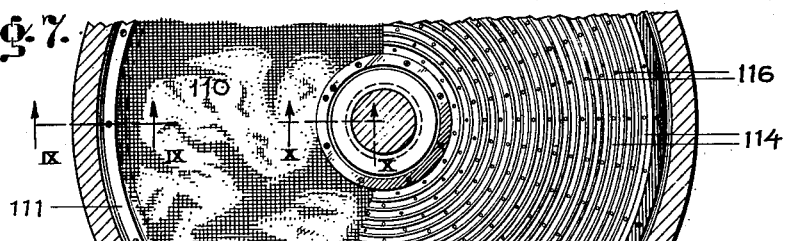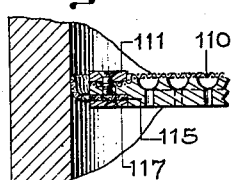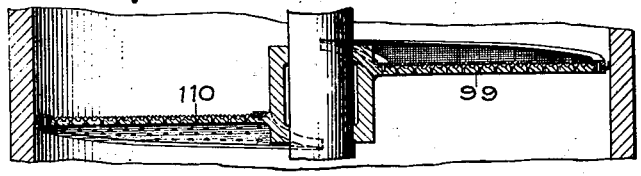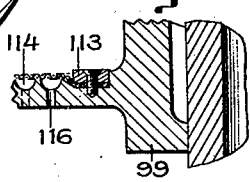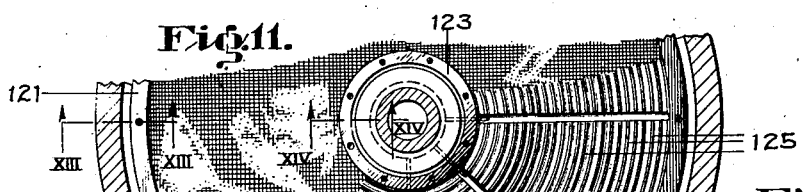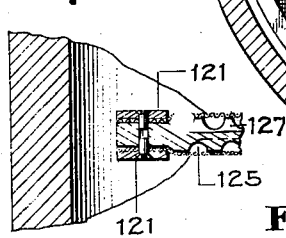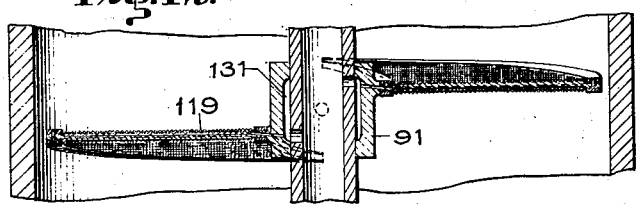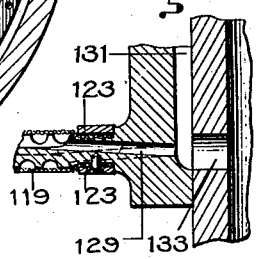

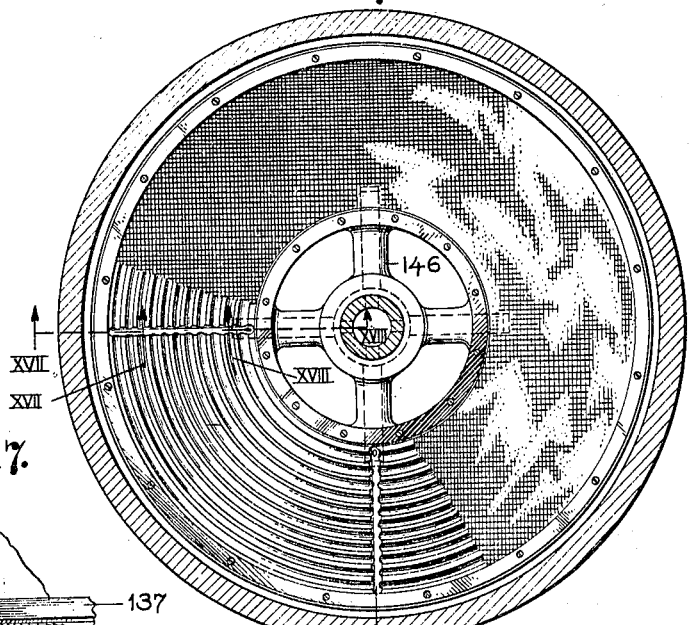
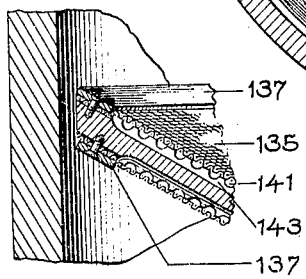
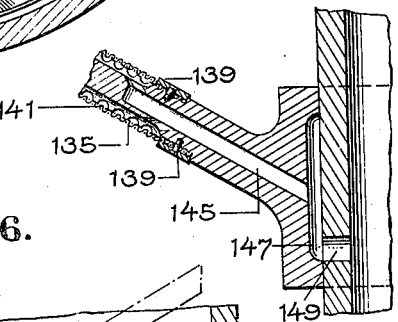
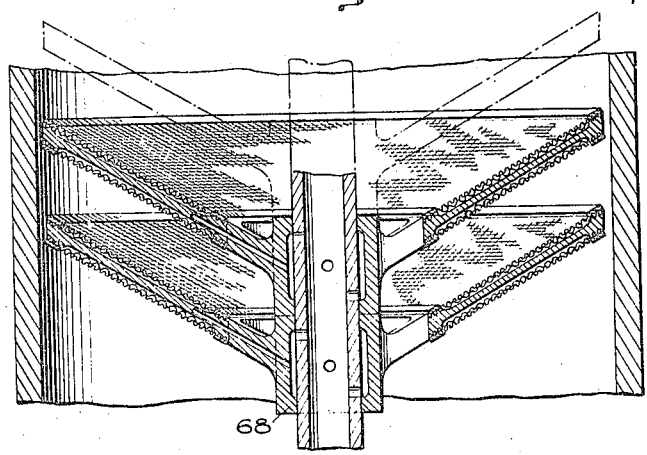

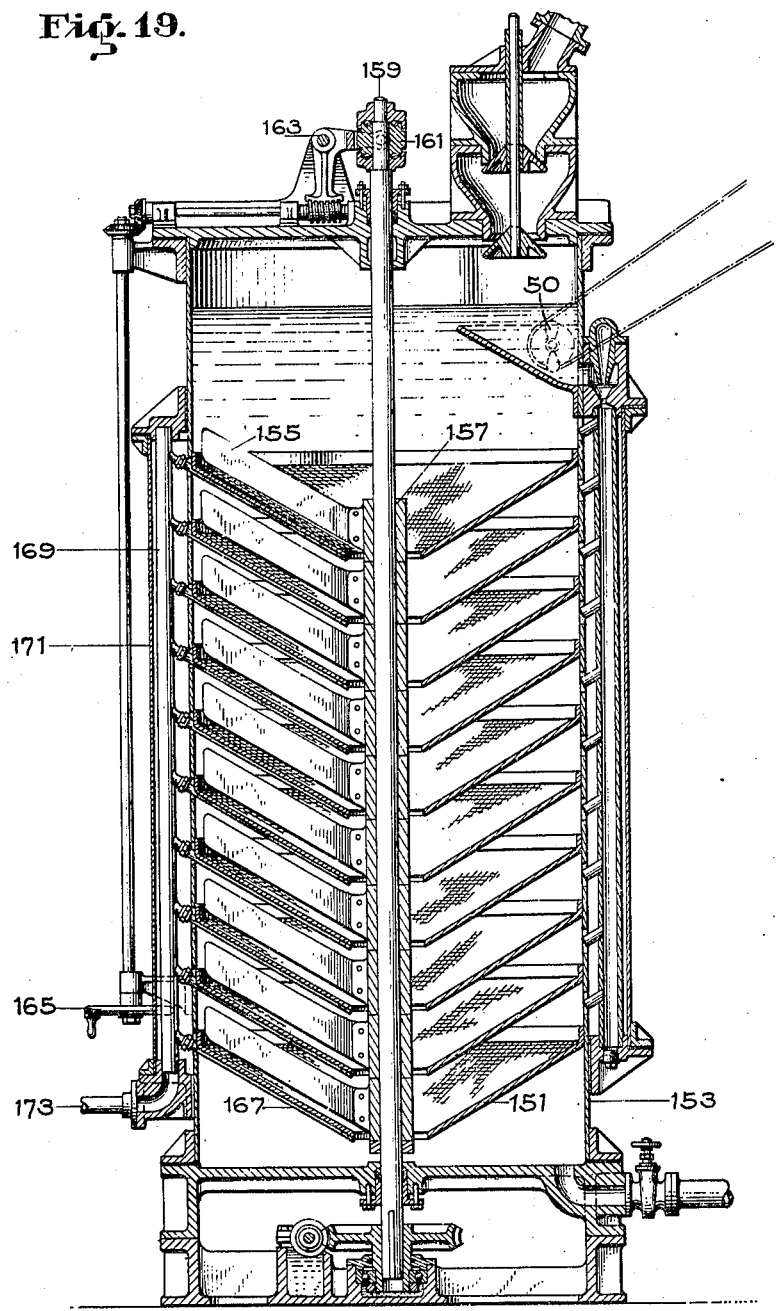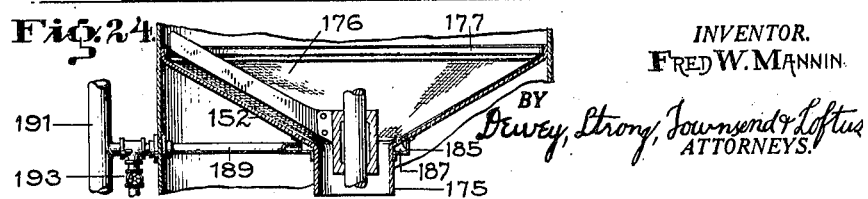

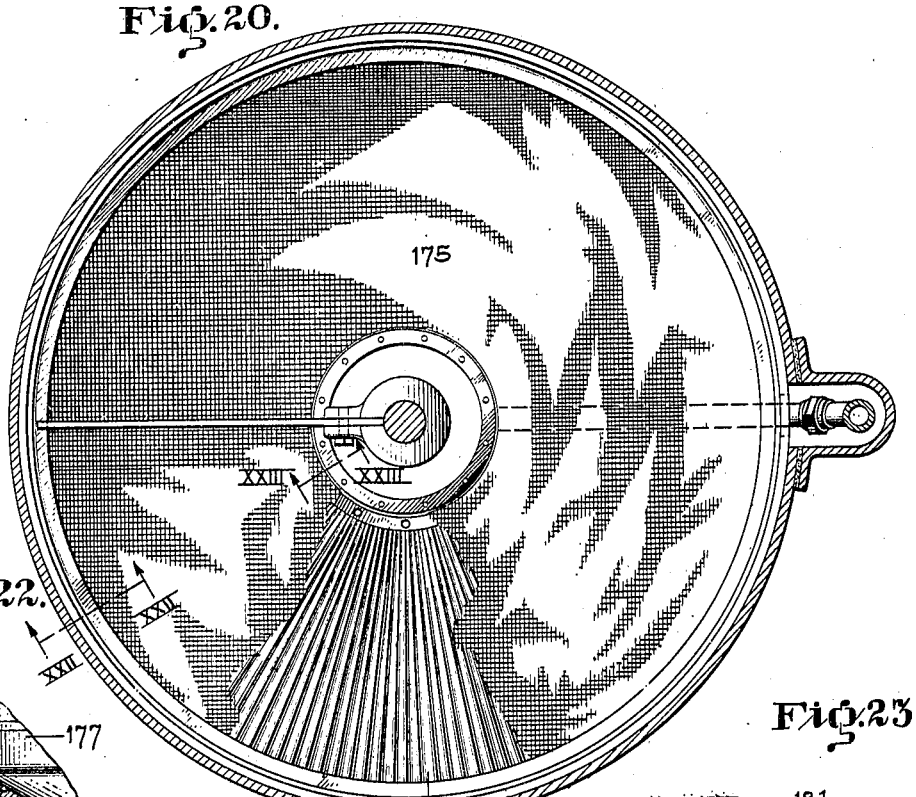
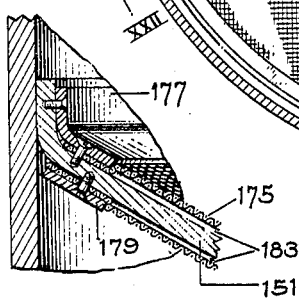
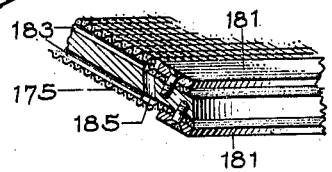
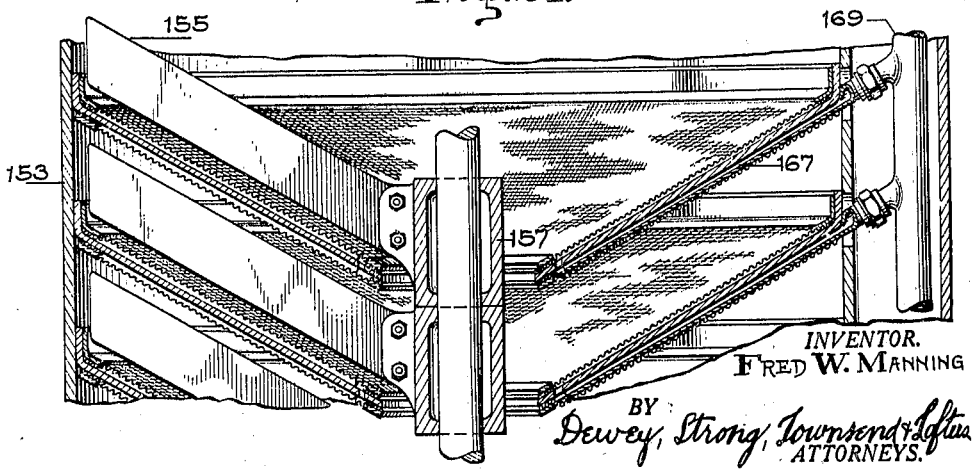

1,686,092

UNITED STATES PATENT OFFICE.

FRED W. MANNING, OF BERKELEY, CALIFORNIA.

PROCESS OF AND APPARATUS FOR THE CONTINUOUS COUNTERCURRENT TREATMENT OF LIQUIDS AND SOLIDS.

Application filed March 20, 1926. Serial No. 96,343.

This invention relates to improvements in methods of and apparatus for the treatment of fluids by solids or solids by fluids as the case may be, but more particularly it relates to the treatment of oils and sugar liquids by granular decolorizing agents.

It is an object of this invention to provide an improved method for introducing a substantially dry treating agent into a liquid under pressure, passing it through various filter and countercurrent chambers and finally discharging it in a substantially dry form, and accomplishing all this with little appreciable wear to the moving parts.

It is a further object of this invention to provide an improved construction of filter elements, wherein liquid is passed through filtered solids on conical filter elements for the purposes of clarification, extraction, etc., and a continuous, or intermittent relative movement between the filter elements and scraper arms used to remove the filtered solids. The filtering elements may be in the form of discs, but preferably are made conical for facilitating the removal of the filtered solids and may taper in either direction, although I usually prefer the solids to be removed downwardly at the center of the filter chamber.

With the above and other objects in view, the invention will be understood by reference to the following description, taken in conjunction with the accompanying drawings which illustrate a preferred form of apparatus for carrying out my invention.

Referring to the drawings:

Figure 1 is a front elevation of the filter and countercurrent chambers, showing piping and lever control arrangements.

Figure 2 is a plan view of the filter and countercurrent chambers.

Figure 3 is a sectional elevation of the filter and countercurrent chambers substantially on line III—III of Fig. 2, showing driving mechanism and inter-communications between filter and countercurrent chambers, with such parts broken away as will more clearly show the invention.

Figure 4 is a sectional plan view of the filter and countercurrent chambers taken on line IV—IV of Fig. 3, showing a conveyor screw and the rabble arm housings with such parts broken away as will more clearly show the invention.

Figure 5 is a transverse sectional elevation through the treated liquid filter chamber, showing driving mechanism and the cutting plane as passing through the filtrate outlet and scraper arms for more clearly illustrating the invention.

Figure 6 is a transverse sectional elevation through the treating countercurrent chamber and rabble chain housing and showing the cutting plane as passing through the filtrate outlet for more clearly illustrating the invention.

Figure 7 is a plan view of a countercurrent flight.

Figure 8 is a transverse section of a countercurrent flight.

Figure 9 is an enlarged sectional view taken on line IX—IX of Fig. 7 to show outer rim fastening means for the filter fabric, the outer wearing ring, and the sealing tape.

Figure 10 is an enlarged sectional view taken on line X—X of Fig. 7, to show inner fastening means for the filter fabric, and the inner wearing ring.

Figure 11 is a plan view of a filter flight.

Figure 12 is a transverse section of a filter flight.

Figure 13 is an enlarged sectional view taken on line XIII—XIII of Fig. 11, to show outer rim fastening means for the filter fabric, and the outer wearing rings.

Figure 14 is an enlarged sectional view taken on line XIV—XIV of Fig. 11, to show inner fastening means for the filter fabric, and the inner wearing rings.

Figure 15 is a plan view of a rotating filter cone.

Figure 16 is a transverse section of a rotating filter cone.

Figure 17 is a section taken on line XVII—XVII of Fig. 15 to show outer rim fastening means for the filter fabric, and the outer wearing rings.

Figure 18 is a section on line XVIII—XVIII of Fig. 15 to show inner fastening means for the filter fabric, and the inner wearing rings.

Figure 19 is a transverse sectional elevation of a filter chamber equipped with permanent filter decks or cones.

Figure 20 is a plan view of a fixed type filter cone.

Figure 21 is a transverse section of a fixed type filter cone.

Figure 22 is a section taken on line

XXII—XXII of Fig. 20 to show outer rim fastening means for the filter fabric, and the outer wearing rings.

Figure 23 is a section taken on line XXIII—XXIII of Fig. 20 to show inner rim fastening means for the filter fabric, and the inner wearing rings.

Figure 24 is a transverse section through a permanent filter deck or cone equipped with filter fabric only on its upper side and having a depending boot.

Figures 1, 2, 3 and 4 show an arrangement in which 1 is the treated liquid filter chamber, 3 the countercurrent treating chamber, 5 the wash filter chamber, and 7 the wash countercurrent chamber; 2, 4, 6 and 8 respectively their hinge side doors, and 10, 12, 14 and 16 respectively their top cover plates which for convenience are shown bolted in halves. Their respective shafts 9, 11, 13 and 15 are driven through their respective worms 17, 19, 21 and 23 on shaft 22 and worm gears 25, 27, 29 and 31, by means of pulley 33, the gears being mounted between the top and bottom bed plates 18 and 20 respectively.

Figure 5 shows more clearly the treated liquid filter chamber. Attached to the top of the chamber 1 is the treating agent feeding valve comprising duplicate valve chambers 34 and 36, in which operate respectively valves 35 and 37 on stems 39 and 41 driven through link mechanism 43 by means of pulley 45. Inside the filter chamber is a receiving hopper 47 situated below the liquid level and which, if necessary, may contain an agitator 50 as shown in Figure 19. The liquid level in all the chambers is maintained constant by float chambers 51 and 53, the former controlling the fluid pressure entering at 55 which regulates the liquid level in chambers 1, 3 and 5, and the latter controlling the fluid pressure entering at 57 which regulates the liquid level in chamber 7. The fluid entering at 55 and 57 may be any suitable fluid as air, steam etc. for drying, revivifying, activating or simply for maintaining an elastic fluid pressure above the liquid level.

A stream through Venturi nozzle 59 causes the treating agent to be drawn from hopper 47 through opening 48 into Venturi receiver 61 and discharged into feed pipe 63 enclosed in housing 65 and through nozzles 67 into the filter chamber between the filter cones 68. Scraper arms 69 slip over and are clamped to the feed pipe 63, and may be adjusted between the filter cones as required by means of collar 71, link motion 73, connecting rod 75 and operating lever 77, wearing rings or guides on the filter cones preventing the scraper arms from coming in contact with the filter surfaces. The filtrate from the filter cones drains into the hollow shaft 9 out through the top bed plate casting 18 to cock 79. The clear filtrate is discharged through pipe 83 to a receptacle not shown, but if the filtrate is cloudy the cock is turned by means of operating lever 81 to switch the filtrate to the centrifugal pump 84 which returns it through the venturi to the filter chamber, and at the same time the operating lever 81 causes the valve 85 controlling the liquid supply line 90 to the countercurrent chamber 3 to be closed.

The wash filter chamber 5 is similar to the treated liquid filter chamber. Submerged hopper 49 receives the solids from the countercurrent treating chamber by means of conveyor 89, although if the connection between the two chambers is sufficiently large, the relative movements of the spiral flights and the rabble arms in the countercurrent chamber, will cause the solids to be swept into the wash filter chamber without the aid of a conveyor. Cock 80 controls the direction of the wash filtrate to the clear filtrate line 96 or the cloudy filtrate line to pump 86, valve 87 controls the wash supply line 92 to the wash countercurrent chamber 7, and both cock and valve are operated by lever 82 so that when the cloudy wash filtrate is being returned to the wash filter chamber, the fresh wash supply valve 87 is closed.

Figure 6 shows more clearly the countercurrent treating chamber. A number of spiral filter flights 91 are situated at the top of the chamber and through drainage connections with the hollow upper end of shaft 11, gland 93, and pipe 95, carry off the drying, revivifying or activating gases with entrained vapors. Likewise, a number of similar spiral filter flights are situated at the bottom of the chamber and through drainage connections with the hollow lower end of shaft 11, filtrate outlet through the top bed plate 18, and pump 84, maintain a sufficient circulation through the filter chamber to carry the filtered solids scraped from off the filter cones into the lower end of the countercurrent treating chamber where they are deposited on the lower filter flights. The countercurrent spiral flights 99 are situated between the top and bottom filter spiral flights. An endless chain of rabble arms 101 linked together by links 103 enclosed in housing 104, coact with and are moved by the spiral flights although the chain may be driven independently when desirable to keep the rabble arms out of contact with the flights. One of the arms 105 is equipped with a suitable fabric such as a fine steel brush for scrubbing and effectually prevents any clogging of the filter or countercurrent spiral flights.

The wash countercurrent chamber 7 discharges its solids either into a succeeding wash filter chamber or through a discharge valve comprising duplicate valve chambers 107 and 109 similar to the feeding valve chambers 34 and 36, and in other respects is similar to the countercurrent treating chamber 3.

Figures 7, 8, 9 and 10 show the details of a countercurrent spiral flight 99, which may be fastened in any suitable manner to its rotating shaft. A suitable fabric or plate 110 for filtering purposes is clamped to the upper or advancing side of the flight by means of an outer ring 111 and an inner ring 113, both of which may also serve as wearing rings for the rabble arms. Circumferential grooves 114 and perforations 116 afford means for the collection and passage of the filtered liquid through the flight. A sealing tape 115 clamped to the flight by means of ring 117 prevents passage of the solids between the flight and the wall of the chamber.

Figures 11, 12, 13 and 14 show the details of a spiral filter flight 91 which is fastened suitably to its rotating shaft. A suitable fabric or plate 119 for filtering purposes is clamped to one or both sides of the flight by means of outer rings 121 and inner rings 123, all of which may also serve as wearing rings for the rabble arms. Circumferential grooves 125, and radial grooves 127 in the flight, radial openings 129 and annular recess 131 in the hub of the flight, and radial openings 133 in the rotating shaft, afford drainage into the hollow rotating shaft for the filtered fluid.

Figures 15, 16, 17 and 18 show the details of a conical filter element 68 fastened to its rotating shaft. A suitable fabric or plate 135 for filtering purposes is shown clamped to both sides of the cone by means of outer rings 137 and inner rings 139, all of which may serve as wearing rings for the scraper arms. Circumferential grooves 141 and radial grooves 143 in the cone, radial openings 145 through the arms 146 in the cone, annular recess 147 in the hub of the cone, and radial openings 149 in the rotating shaft, afford drainage into the latter for the filtered liquid.

Figure 19 shows a suitable construction of filter chamber when the handling of large quantities of liquid make necessary filter tanks of great diameter. In this construction the filter decks or cones 151 are fixed to the shell of the filter tank 153 and the scraper arms 155 attached to hubs 157 are rotated by shaft 159. The scraper arms are adjusted relatively to the filter decks by means of a yoke 161, quadrant 163, and adjusting wheel 165. The filtered liquids is carried through filtrate outlet pipes 167 to filtrate manifold 169 enclosed in housing 171, and from the manifold is carried off through pipe 173.

Figures 20, 21, 22 and 23 show the details of a stationary filter deck 151 fastened to the filter tank 153. A suitable fabric or plate 175 for filtering purposes is shown clamped to both sides of the deck by means of outer top ring 177 and an outer under ring 179, and inner rings 181, all of which may serve as wearing rings for the scraper arms. Crimped plates 183, deck openings 185, and filtrate pipes 167 convey the filtered liquid to the filtrate manifold 169.

Figure 24 is a modification of the filter deck construction shown in Figures 20, 21, 22 and 23, in which the filter deck 152 has a depending boot 175, but only a top filtering surface 176. The filtered liquid passes through openings 185 into the filtrate collection ring 187, out through filtrate pipe 189 into the filtrate manifold 191. A valve 193 may be used for testing the clarity of the filtrate.

The operation of the apparatus thus constructed has been in part indicated in connection with the foregoing description. Treating solids such as fuller's earth for oil, bone char for sugar liquor, etc., enter the feeding valve chamber 34 and by means of the alternate opening and closing of valves 35 and 37, are fed by gravity into the elastic fluid zone in the top of casing 1 without loss of the fluid pressure.

The treating solids on falling through the elastic fluid zone, either due to their weight or the circulation maintained by means of venturi 59 and the circulating pump 84, quickly sink below the liquid level into the submerged hopper 47 and are drawn through opening 48, discharged into feed pipe 63 and through nozzles 67 uniformly between each of the filter elements on whose top and bottom filtering surfaces they collect in the form of filter cake. Due to the conical shape of the filter elements and their slow rotation against scraper arms fixed in a tangential position to the discharge openings in the filter cones, the solids are gradually moved inwardly and downwardly into a common discharge path where their collected weight and the circulation maintained, carry them into the lower end of the countercurrent treating chamber. The collection of the solids on the upper surface of the filter elements is due partially to filtration and partially to sedimentation but on the underside wholly due to filtration. Depending boots 175 as shown in Figure 24 may be used when the decks are not too close together and they serve to make the common discharge path more definite and prevent further collection of the solids on lower filtering surfaces after having been removed from the higher filter elements. Usually sufficient cake solids are allowed to remain on the filter elements to give clarity to the filtrate, but in time these solids must be removed by the adjusting of the feed pipe which carries the scraper arms at which time the liquid supply streams from the feed nozzles will assist in cleansing the filtering surfaces immediately the solids have been scraped therefrom.

The lower flights in the countercurrent treating chamber are for filtering purposes and as clarity of filtrate is not here essential, the rabble arms may closely coact with the filtering surfaces and thus maintain a sufficiently high filtering rate to take care of not only the liquid flowing downwardly through the countercurrent chamber, but to withdraw a sufficient amount of liquid from the filter chamber to carry in and deposit on the filter flights the solids that have been removed from the filter cones, the cloudy filtered liquid being pumped to the treated liquid filter chamber through venturi 59. However, it is to be understood that other suitable arrangements may be used for conveying the filtered solids from the filter chamber into the lower end of the countercurrent chamber such as a conveyor arrangement similar to that shown in Fig. 3, for conveying the utilized solids from the upper end of the countercurrent treating chamber into the wash filter chamber. Or the filter chamber may have a conical bottom and a downwardly connecting passage to the countercurrent chamber which may serve to convey the solids by gravity on to the filter flights.

The solids on being deposited on the filter flights are at once slowly conveyed upwards by means of an endless chain of rabble arms coacting with the flights, and at the same time they are continually rabbled to cause a continuous distribution to be made on the upper face of the countercurrent flights through which the liquid passing in downward movement is gradually brought to the desired state of treatment.

The solids on passing above the liquid level are carried from the countercurrent flights on to filter flights where a certain amount of soakage is removed when they are subjected to the action of an elastic fluid such as air or other suitable fluid for drying or for other purposes, the filtered fluids being carried off through the hollow upper end of shaft 11 and outlet pipe 95. In order that a substantially constant level of liquid may always be maintained, the elastic fluid pressure in supply line 55 to the float chamber 51 should always be somewhat higher than the pressure existing in the liquid supply line 90. This can easily be accomplished by placing a relief valve in the liquid supply line.

The wash filter chamber, into which the utilized solids are conveyed from the countercurrent treating chamber, is similarly constructed and operated to the treated liquid filter chamber and the countercurrent wash chamber is similarly constructed and operated to the countercurrent treating chamber. From the countercurrent wash chamber the solids may be passed out through a discharge valve of similar construction to the feeding valve, or they may again pass through succeeding wash filter, and wash countercurrent chambers and finally out of the apparatus through a discharge valve.

The washing in the wash countercurrent chambers may be for the purpose of removing values from the solids as the removal of sugar from bone char by any suitable liquid such as hot water, or the removal of oil from fuller's earth by any suitable liquid such as naphtha, or the washing may be for the purpose of revivifying or activating the treating solids by any suitable liquid such as alcohol, benzol, acetone, or acid such as sulphuric, or alkali such as caustic soda, or any combination of them.

The arrangement shown in Figures 1, 2, 3 and 4 of filter and their cooperative countercurrent chambers is best for locations where the head room is limited, but it is understood that many modifications of this arrangement may be used. The countercurrent treating chamber 3 may be placed below and be a continuation of the treated liquid filter chamber 1 with the treating solids moving downward through both chambers, and the wash countercurrent chamber 7 may be placed above and be a continuation of the wash filter chamber 5, with the solids after being passed into the bottom of the wash filter chamber being carried upward through both wash filter and wash countercurrent chamber by means of an endless rabble chain. Such an end to end relation of the filtering and washing chambers is generally shown in my copending applications Serial No. 689,178 filed Jan. 28, 1924, Ser. No. 747,431 filed Nov. 3, 1924, and Ser. No. 20,155 filed April 2, 1925. Or a modification such as described in my copending application Serial No. 37,600, filed June 17, 1925, may be used.

It will also be evident from the foregoing description, that all the chambers may be open at the top and the treating, washing and filtering operations carried on under atmospheric pressure. Pumps 84 and 86 may be used to exert a suction pull on the filtrate lines of the spiral filter flights and a similar pumping arrangement may be used to carry off the clear filtrate and exert a suction pull on the filter cones, and this will aid operations in open top tanks. However, for most purposes where speed is desirable, the operations should be carried on under superatmospheric pressure and this will also make possible the further treatment of the solids by elastic fluids.

Having thus described my invention, what I claim is:

1. A filtering process which comprises rotating a submerged filter element in a liquid and filtering the liquid through the element while the liquid is subjected to a superatmospheric pressure of an elastic fluid.

2. A filtering process which comprises introducing treating solids into an elastic fluid zone situated above the level of a liquid to be filtered, distributing the solids throughout the liquid, and thereafter filtering the liquid through the solids.

3. A filtering process which comprises introducing treating solids into an elastic fluid zone situated above the level of a liquid to be filtered, distributing the solids throughout the liquid, collecting the solids on a plurality of filtering surfaces, mechanically working the collected solids toward a common discharge region, and removing the solids from the said region.

4. A filtering process which comprises collecting the solids by a combined sedimentation and filtration treatment on a plurality of filtering surfaces, mechanically working the collected solids toward a common discharge region, and removing the solids from the said region.

5. A filtering process which comprises collecting the solids on a plurality of superimposed filtering surfaces lying in different planes, mechanically working the collected solids toward a common discharge region, and removing the solids from the said region.

6. A filtering process which comprises introducing treating solids into a liquid, collecting the solids on a plurality of separate filtering surfaces, mechanically working the collected solids toward a common discharge region, and removing the solids from the said region.

7. A treating and washing process which comprises continuously passing solids through a liquid to be treated, separating the solids from the liquid, thereafter passing the utilized solids through a wash fluid to prepare the solids for further use, said solids, liquid and fluid being subjected to a superatmospheric pressure of an elastic fluid during the said treating and washing operations, and returning the washed solids for further treatment of liquid in said first step.

8. A countercurrent and filtering process which comprises counter-currently contacting a liquid with solids, and thereafter separating solids from the liquid while both liquid and solids are subjected to a superatmospheric pressure of an elastic fluid.

9. A treating and filtering process which comprises treating a liquid by passing treating solids counter-currently through the liquid, and thereafter filtering the treated liquid through fresh treating solids while both liquid and solids are subjected to a superatmospheric pressure of an elastic fluid during said treating and filtering operations, and employing said fresh treating solids in the treating of the liquid as first mentioned after they have been used in said filtering operation.

10. A continuous treating and filtering process which comprises continuously introducing substantially dry treating solids into a treated liquid, filtering the treated liquid through the solids, using the same solids to treat a further portion of liquid, thereafter washing and drying the solids, all of such operations being carried on under a superatmospheric pressure of an elastic fluid, and returning the re-conditioned solids for further treatment of liquid in the first step referred to.

11. A filter comprising an air tight casing, a filter element in the casing rotating below the level of the liquid to be filtered, and means for supplying an elastic pressure fluid to the casing above the level of the said liquid.

12. A filter comprising an air tight casing, a filter element in the casing rotating below the level of the liquid to be filtered, and means for supplying an elastic pressure fluid to the casing above the level of the said liquid.

13. A filter comprising an air tight casing, a filter element in the casing below the level of the liquid to be filtered, and a float chamber for supplying an elastic pressure fluid to the casing above the level of the liquid whereby the liquid is maintained at a constant level.

14. A filter comprising an air tight casing, a filter element in the casing below the level of the liquid to be filtered, means for supplying an elastic pressure fluid above the level of the liquid, and means for feeding substantially dry treating solids into the elastic fluid zone.

15. A filter comprising an air tight casing, a filter element in the casing below the level of the liquid to be filtered, means for supplying an elastic pressure fluid above the level of the liquid, and means for feeding substantially dry treating solids into the elastic fluid zone, means below the level of the liquid for receiving the solids, and means for distributing the solids throughout the liquid.

16. A filter comprising an air tight casing, a plurality of filter elements in the casing below the level of the liquid to be filtered, means for supplying an elastic pressure fluid above the level of the liquid, means for feeding substantially dry treating solids into the elastic fluid zone, means below the level of the liquid for receiving the solids, and means for uniformly distributing the solids between each of the said elements.

17. In a filter, a chamber containing a plurality of filter elements connected together in spaced relation, and Venturi means for supplying a fluid containing solids to the said chamber.

18. In a filter, a chamber containing a plurality of separate filter elements connected together in spaced relation with their filtering surfaces in different planes, means for supplying a fluid containing solids to the said chamber to submerge the filter elements, means for collecting the solids upon the said elements, means for removing the collected solids from the elements, and means for discharging the solids from the said chamber.

19. In a filter, a chamber containing a plurality of separate rotatable filter elements connected together in spaced relation, means for supplying a fluid containing solids to the said chamber to submerge the said elements, a filtrate outlet pipe connected with the center of the elements and located in the axis of rotation, a plurality of scraper arms for removing the filtered solids from the filter elements, and means for discharging the solids from the said chamber.

20. In a filter, a chamber containing a plurality of separate filter elements connected together in spaced relation, means for feeding the liquid to the said chamber to submerge the said filter elements, means for uniformly distributing treating solids in the liquid between each of the said elements, means for collecting the solids upon the elements, means for removing the collected solids from the elements, and means for discharging the solids from the said chamber.

21. In a filter, a chamber containing a plurality of separate filter elements connected together in spaced relation, means for supplying a fluid containing solids to the said chamber to submerge the said elements, a plurality of scraper arms in the same spaced relation, means for providing relative movement between the elements and scraper arms to cause the filtered solids to be removed from the said elements, and means for discharging the solids from the said chamber.

22. In a filter, a chamber containing a plurality of separate filter elements connected together in spaced relation, means for supplying a fluid containing solids to the said chamber to submerge the said elements, a plurality of scraper arms in the same spaced relation, means for providing relative movement between the elements and scraper arms to cause the filtered solids to be moved inwardly and downwardly across the filter elements, and means for discharging the solids from the said chamber.

23. In a filter, a chamber containing a plurality of separate filter elements connected together in spaced relation, means for supplying a fluid containing solids to the said chamber to submerge the said elements, a plurality of scraper arms, means to cause the surface of the filter elements to move adjacent to the scraper arms whereby the filtered solids are removed from the filter elements, and means for discharging the solids from the said chamber.

24. In a filter, a plurality of filter elements connected together in spaced relation, a plurality of scraper arms adjacent to the filter elements, and guides to prevent contact of the scrapers with the said filter elements.

25. In a filter, a plurality of filter elements connected together in spaced relation, a plurality of scraper arms adjacent to the filter elements, guides to prevent contact of the scrapers with the said filter elements, and means to adjust the position of the scrapers relative to the filter elements.

26. In a filter, a plurality of filter elements connected together in spaced relation and submerged in the fluid to be filtered, a plurality of scraper arms adjacent to the filter elements, a fluid supply pipe with discharge nozzles or openings, and means to adjust the position of the scrapers and fluid supply pipe relative to the filter elements whereby the elements are subject to a cleansing action by fluid pressure simultaneously with the mechanical removal of the filtered solids therefrom.

27. In a filter, a plurality of filter elements connected together in spaced relation, a centrally disposed opening in each element forming a solids discharge path common to all of the said elements, filtering means on the upper side of each element for collecting and separating the solids from the liquid, and means for removing the collected and separated solids from the said elements and passing them through the said solids discharge path.

28. A countercurrent apparatus comprising an air tight casing, a countercurrent filter element rotating therein, causing solids to be passed in countercurrent direction through a liquid and means for supplying an elastic fluid to the casing above the level of the said liquid.

29. A countercurrent apparatus comprising an air tight casing, a countercurrent filter element rotating therein causing solids to be passed in countercurrent direction through a liquid, means for supplying an elastic fluid to the casing above the level of the said liquid, and means for causing the said fluid to remove soakage from the said solids as they are moved above the liquid level.

30. A countercurrent and filtering apparatus comprising a countercurrent chamber in which a liquid is counter-currently contacted with solids, a filter chamber in which the contacted liquid is separated from solids, means for passing solids from the filter chamber to the countercurrent chamber, and means for passing the contacted liquid from the countercurrent chamber to the filter chamber.

31. A countercurrent and filtering apparatus comprising a countercurrent chamber in which a liquid is counter-currently contacted with solids, a filter chamber in which the contacted liquid is separated from solids, means for passing solids from the filter chamber to the countercurrent chamber, and means for passing the contacted liquid from the countercurrent chamber to the filter chamber, and means for supplying an elastic fluid above the level of the liquid in each chamber.

32. A treating, washing and filtering apparatus comprising a chamber in which a liquid is treated by solids, a treated liquid filter chamber in which the treated liquid is separated from solids, a washing chamber in which the utilized solids are washed by ing a salt of a fatty acid, and a cathode, a nickel anode and a copper anode disposed in said bath, substantially as described.

21. An electrolytic cell consisting of a bath comprising a mixture of a substantially saturated solution of nickel sulfate and a substantially saturated solution of copper sulfate in the proportion of substantially three hundred parts by weight of nickel sulfate to three parts by weight of copper sulfate, said bath also containing substantially eighteen parts by weight of acetate of nickel, and a cathode, a nickel anode and a copper anode disposed in said bath, substantially as described.

22. In an electro-plating system, an electrolytic cell comprising a bath containing solutions of salts of two metals to be plated, and two anodes respectively formed of said two metals and a cathode disposed in said bath, and means automatically operative to effect passage of current through said cell alternately in two paths respectively including one of said anodes, the electrolyte and the cathode and the other of said anodes, the electrolyte and the cathode, and to effect agitation of the electrolyte during each passage of current through the cell in the path including one of said anodes, substantially as described.

23. In an electro-plating system, an electrolytic cell comprising a bath containing a copper-plating solution and a nickel-plating solution, and a copper anode, a nickel anode and a cathode disposed in said bath, and means automatically operative to effect passage of current through said cell alternately in two paths respectively including the copper anode, the electrolyte and the cathode and the nickel anode, the electrolyte and the cathode, and to effect agitation of the electrolyte during each passage of current through the cell in the path including the copper anode, substantially as described.

24. An electrolytic cell consisting of a bath containing solutions of salts of two metals to be plated, and two anodes respectively formed of said two metals and a cathode disposed in said bath, one of said anodes being disposed between the other anode and the cathode and being provided with perforations extending therethrough, substantially as described.

25. An electrolytic cell consisting of a bath comprising a mixture of a copper-plating solution and a nickel-plating solution in which the nickel-plating solution greatly predominates, and a cathode, a nickel anode and a copper anode disposed in said bath, said copper anode being provided with perforations extending therethrough, substantially as described.

26. An electrolytic cell consisting of a bath comprising a mixture of a nickel-plating solution and a copper-plating solution, and a cathode, a nickel anode and a copper anode disposed in said bath, said copper anode being disposed between the nickel anode and the cathode and being provided with perforations extending therethrough, substantially as described.

This specification signed this 30th day of September, 1919.

THOS. A. EDISON.